US012048673B2

(12) United States Patent
Ribani et al.

(10) Patent No.: US 12,048,673 B2
(45) Date of Patent: Jul. 30, 2024

(54) FILLING MACHINE FOR FILLING CAPSULES

(71) Applicant: I.M.A. INDUSTRIA MACCHINE AUTOMATICHE S.P.A., Ozzano Dell'emilia (IT)

(72) Inventors: Massimo Ribani, Ozzano Dell'emilia (IT); Maurizio Bedetti, Ozzano Dell'emilia (IT); Alessandro Masotti, Ozzano Dell'emilia (IT)

(73) Assignee: I.M.A. INDUSTRIA MACCHINE AUTOMATICHE S.P.A., Ozzano Dell'emilia (IT)

( * ) Notice: Subject to any disclaimer, the term of this patent is extended or adjusted under 35 U.S.C. 154(b) by 94 days.

(21) Appl. No.: 17/925,219

(22) PCT Filed: May 11, 2021

(86) PCT No.: PCT/IB2021/053993

§ 371 (c)(1),
(2) Date: Nov. 14, 2022

(87) PCT Pub. No.: WO2021/229426

PCT Pub. Date: Nov. 18, 2021

(65) Prior Publication Data

US 2023/0225945 A1 Jul. 20, 2023

(30) Foreign Application Priority Data

May 13, 2020 (IT) ........................ 102020000010855

(51) Int. Cl.
*A61J 3/07* (2006.01)

(52) U.S. Cl.
CPC .................................... *A61J 3/074* (2013.01)

(58) Field of Classification Search
CPC ........... A61J 3/074; B65B 57/04; Y10S 53/90
(Continued)

(56) References Cited

U.S. PATENT DOCUMENTS 8,333,052 B2 12/2012 Ansaloni et al.
9,157,784 B2 * 10/2015 Trebbi et al. ........... A61J 3/074
(Continued)

FOREIGN PATENT DOCUMENTS

BR PI 1004548-1 4/2012
EP 3 295 920 3/2018
(Continued)

OTHER PUBLICATIONS

Indian Office Action issued Jan. 17, 2023 in corresponding Indian Patent Application No. 202227061928, with English translation,.
(Continued)

*Primary Examiner* — Stephen F. Gerrity
(74) *Attorney, Agent, or Firm* — Wenderoth, Lind & Ponack, L.L.P.

(57) ABSTRACT

A filling machine for filling capsules with at least one product includes operating stations for operating on the capsules, and a moving system for transferring the capsules through the operating stations that include first and second dosing stations that are configured to fill the capsules with respective products. The moving system includes a linear electric motor, a guide rail, which includes a stator of the motor, and transfer carriages associated with the guide rail and provided with respective seats to house bodies and caps of the capsules. The transfer carriages have respective rotors of the motor interacting independently with respective magnetic fields generated by the stator to move the respective transfer carriages along the guide rail with an intermittent motion at the first dosing station when the first dosing station is activated and/or with a continuous motion at the second dosing station when the second dosing station is activate.

13 Claims, 3 Drawing Sheets

(58) Field of Classification Search
USPC .................... 53/64, 560, 237, 240, 282, 900
See application file for complete search history.

(56) References Cited

U.S. PATENT DOCUMENTS

| | | | |
|---|---|---|---|
| 2011/0146840 A1 | 6/2011 | Ansaloni et al. | |
| 2015/0158614 A1 | 6/2015 | Malick et al. | |
| 2018/0072551 A1* | 3/2018 | Burkhard et al. | B67C 3/225 |

FOREIGN PATENT DOCUMENTS

| | | | |
|---|---|---|---|
| WO | 2010/070592 | 6/2010 | |
| WO | WO-2019087066 A1 * | 5/2019 | A61J 3/074 |

OTHER PUBLICATIONS

International Search Report issued Jul. 22, 2021 in International (PCT) Application No. PCT/IB2021/053993.

* cited by examiner

FILLING MACHINE FOR FILLING CAPSULES

The present invention relates to automatic machines for packaging pharmaceutical and/or food products and, in particular, relates to a machine for filling capsules, operculums or similar elements with one or more pharmaceutical or food products or another type of product.

Various types of filling machines are known, arranged to fill capsules, in particular capsules of the body-cap type, made of hard gelatin, with pharmaceutical or food products in liquid or powder form, in granules, tablets, micro-tablets, delayed-action drugs, etc.

Some of the known filling machines comprise a movement turret or wheel, rotating with intermittent motion around a vertical axis and provided with housings or seats suitable for receiving the capsules, and a plurality of operating stations arranged around the aforementioned movement turret. Rotating, the latter moves the capsules through the different operating stations which act on the capsules during the stop steps of the intermittent motion. The operating stations comprise at least one capsule feeding station, one or more dosing stations and a capsule closing station.

In the feeding station an apparatus is included which picks up the capsules from a warehouse and, after having correctly oriented them, inserts them into the seats of the transfer turret. Appropriate means open the capsules by separating and distancing the caps from the respective bodies.

A certain amount of product is dispensed into the bodies of the capsules in the dosing station.

In the closing station the caps are again coupled to the respective bodies so as to close and recompose the capsules filled with the product which are then conveyed out of the filling machine.

In some filling machines the dosing station of products in powder form, in granules, tablets, micro-tablets, delayed action drugs, etc. comprises a dosing turret or wheel, also rotating with intermittent motion about a respective vertical axis and generally provided with two groups of volumetric dosing devices, angularly spaced 180° apart from one another with respect to the vertical axis and capable of picking up defined amounts or doses of product from a reservoir, in a picking position, and transferring and then releasing the doses into the capsule bodies, in a releasing position.

The volumetric dosing devices of each group are angularly spaced apart and arranged so as to interact with a corresponding number of capsules housed in the seats of the dosing turret.

Each dosing device includes a hollow tube or cylinder, arranged parallel to the vertical axis of the dosing turret and provided with a lower opening, and a respective piston that slides inside the hollow cylinder. The piston forms an inferiorly open dosing chamber inside the hollow cylinder so as to receive and retain the product when the cylinder is inserted and immersed in a product layer contained in a reservoir. The linear movement along the vertical axis of the dosing devices between a lowered position and a raised position is achieved by moving the entire dosing turret vertically, or by moving the dosing devices with respect to the dosing turret.

In the lowered position of the dosing turret, while the cylinders of one group of dosing devices are immersed in the product inside the reservoir, so as to load and pick up respective product doses, the cylinders of the other group of dosing devices are superimposed and substantially in contact with respective bodies of capsules to be filled, so as to transfer and yield to the latter the product doses.

The dosing station can also comprise a dosing arm which supports at one end thereof a group of volumetric dosing devices comprising respective hollow cylinders and relative pistons. The dosing arm is linearly movable both vertically and horizontally with intermittent motion between a lowered picking position in which the dosing devices are immersed in the product inside the reservoir to load and pick up respective product doses, and a lowered dosing position in which the aforementioned dosing devices are superimposed and substantially in contact with respective capsule bodies to dispense the product doses.

The same dosing arm can support a group of dosing devices for liquid products.

Filling machines are also known in which the movement turret rotates continuously about the vertical axis and the dosing station is configured to dispense the product doses in the capsule bodies during the movement thereof.

The type of filling machine (with intermittent or continuous motion) and/or the type of dosing station (with rotating dosing turret or with dosing arm with linear motion) are chosen according to the features of the product to be dispensed, for example whether in powder form, in granules, tablets, micro-tablets, delayed-action drugs, to the propensity thereof to be compacted and/or compressed, and the production speed or hourly productivity required.

For this reason, the same filling machine, operating with intermittent motion or with continuous motion, is not suitable for dispensing different types of products in the capsules with the same precision and/or production speed.

An object of the present invention is to improve the known filling machines for filling capsules, operculums or similar elements with products in liquid or powder form, granules, tablets, micro-tablets, delayed-action drugs or the like, in particular pharmaceutical or food products.

Another object is to realize a filling machine which allows filling with the same degree of reliability, precision and repeatability capsules, operculums or similar elements with different types of products, also very different from each other.

A further object is to realize a high-performance filling machine with a simple and robust structure and reliable and safe operation.

Such objects and others are achieved by a filling machine according to any of the claims set forth below.

The invention can be better understood and implemented with reference to the attached drawings which illustrate an exemplary and non-limiting embodiment thereof, in which.

Figure 1:
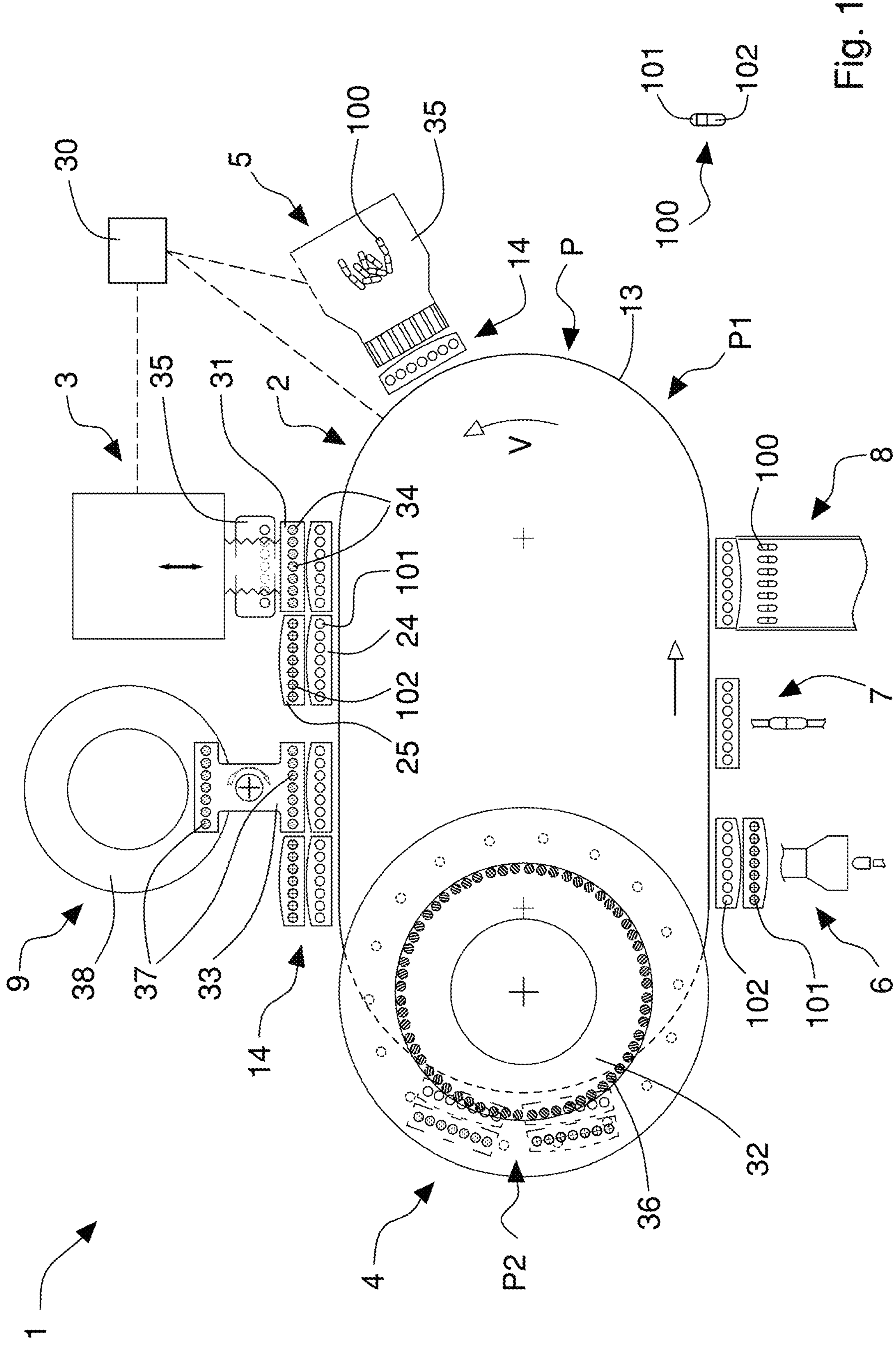
FIG. 1 is a schematic plan view from above of the capsule filling machine according to the invention and of a closed capsule to be filled.

Referring to FIG. 1, the filling machine 1 according to the invention arranged to fill capsules 100, operculums or similar containers with one or more liquid, powder, granular, tablet, micro-tablet, delayed-action drugs or similar products, particularly pharmaceutical or food or other products, comprises a plurality of operating stations 3-8 arranged to act on the capsules 100 and a moving system 2 for transferring the capsules 100 in sequence through said plurality of operating stations.

The capsules 100 are, for example, made of hard gelatin and each formed by a cap 101 and a respective body 102 connected together in a reversible manner to allow the opening of the capsule 100 for the filling thereof with the product and therefore the subsequent closure thereof The plurality of operating stations of the filling machine 1 comprises a first dosing station 3 and a second dosing station 4 which are selectively activable and configured to fill the capsules 100 with respective products. The plurality of operating stations also comprises a feeding station 5, a selection and rejection station 6, a closing station 7 and an exit station 8.

The filling machine 1 further comprises a control unit 30 adapted to control the operating stations 3-8 and the moving system 2 during operation.

Weighing stations, not shown in FIG. 1, can be provided before the dosing stations 3, 4 and after each of them to measure the actual amount of product dosed in the capsules 100. In the feeding station 5, the capsules 100 are picked up from a reservoir 35, transferred to the moving system 2 and opened by separating and spacing the caps 101 from the respective bodies 102.

In the selection and rejection station 6, located downstream of the dosing stations 3, 4 with reference to a feed direction V of the capsules 100 in the filling machine 1, the defective or non-compliant capsules 100, for example because they contain excessive or insufficient quantities of product, are picked up from the moving system 2 and discarded.

In the closing station 7 the caps 101 and the bodies 102 are re-coupled to close the respective capsules 100.

In the exit station 8 the capsules 100 containing a correct quantity of product or products are picked up from the moving system 2 and conveyed out of the filling machine 1.

Figure 2:
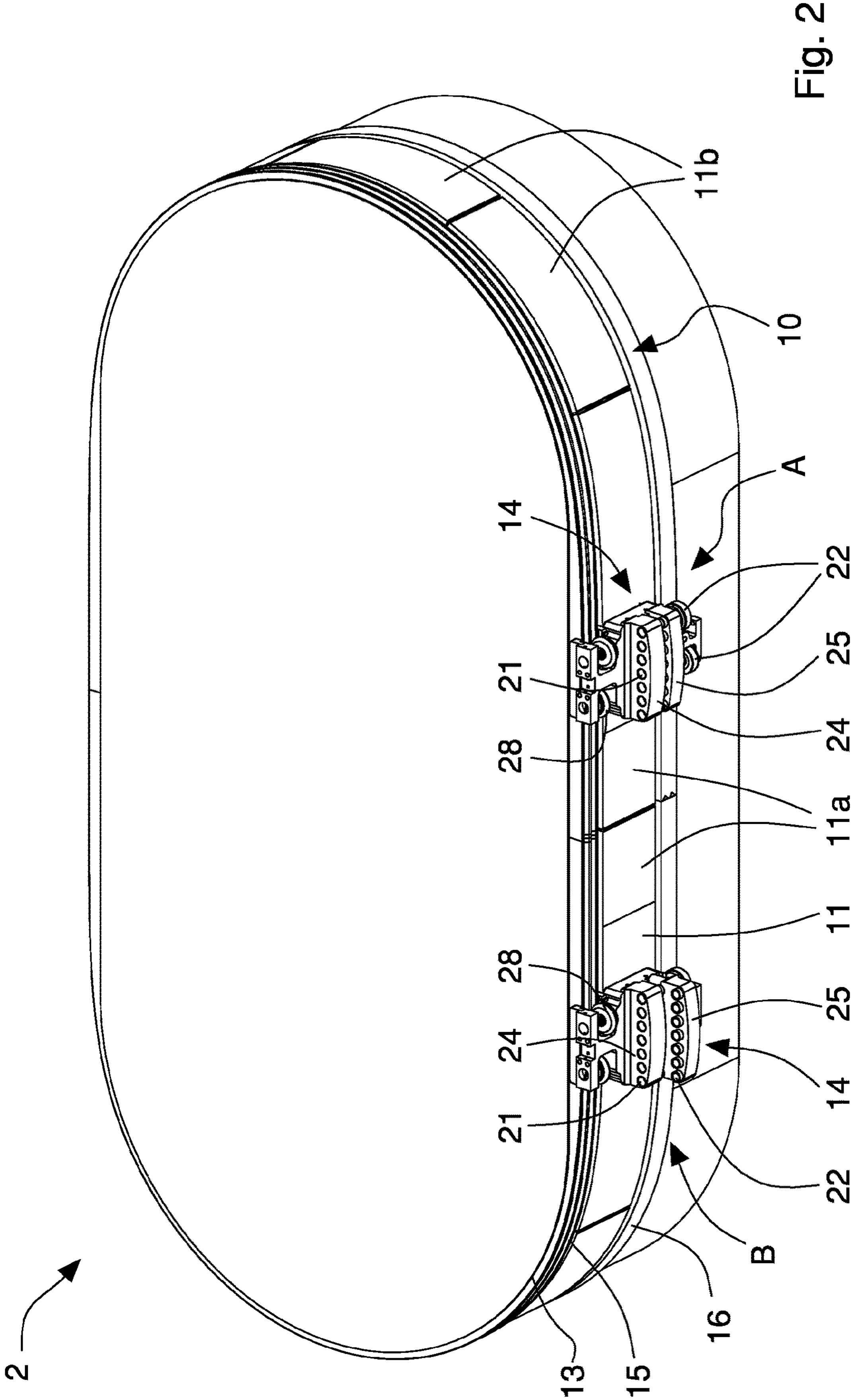
FIG. 2 is a schematic perspective view of a capsule moving system of the filling machine of FIG. 1, in particular provided with a pair of transfer carriages, each of which comprises a pair of supporting elements for caps and bodies of the capsules, respectively.
Figure 3:
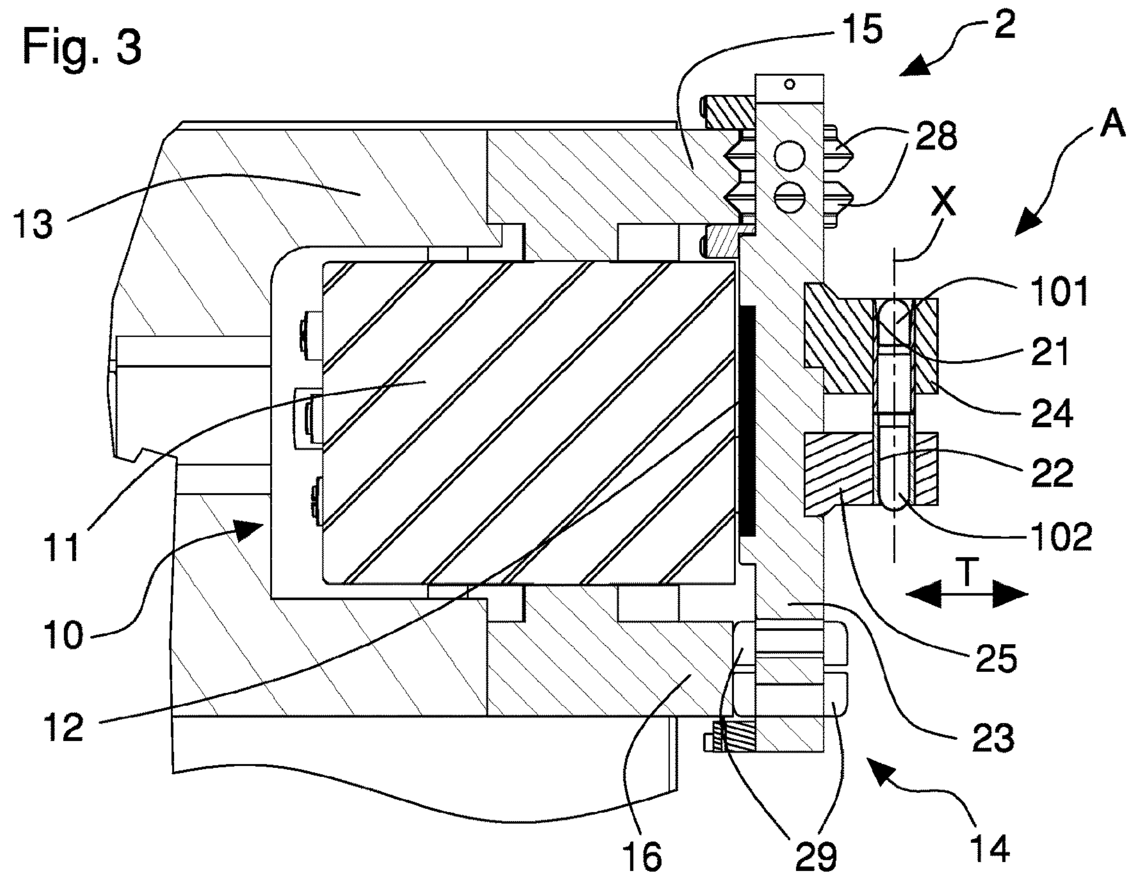
FIG. 3 is a partial cross section of the moving system and of a transfer carriage of FIG. 2 illustrating in particular the supporting elements of the transfer carriage in overlapping position.
Figure 4:
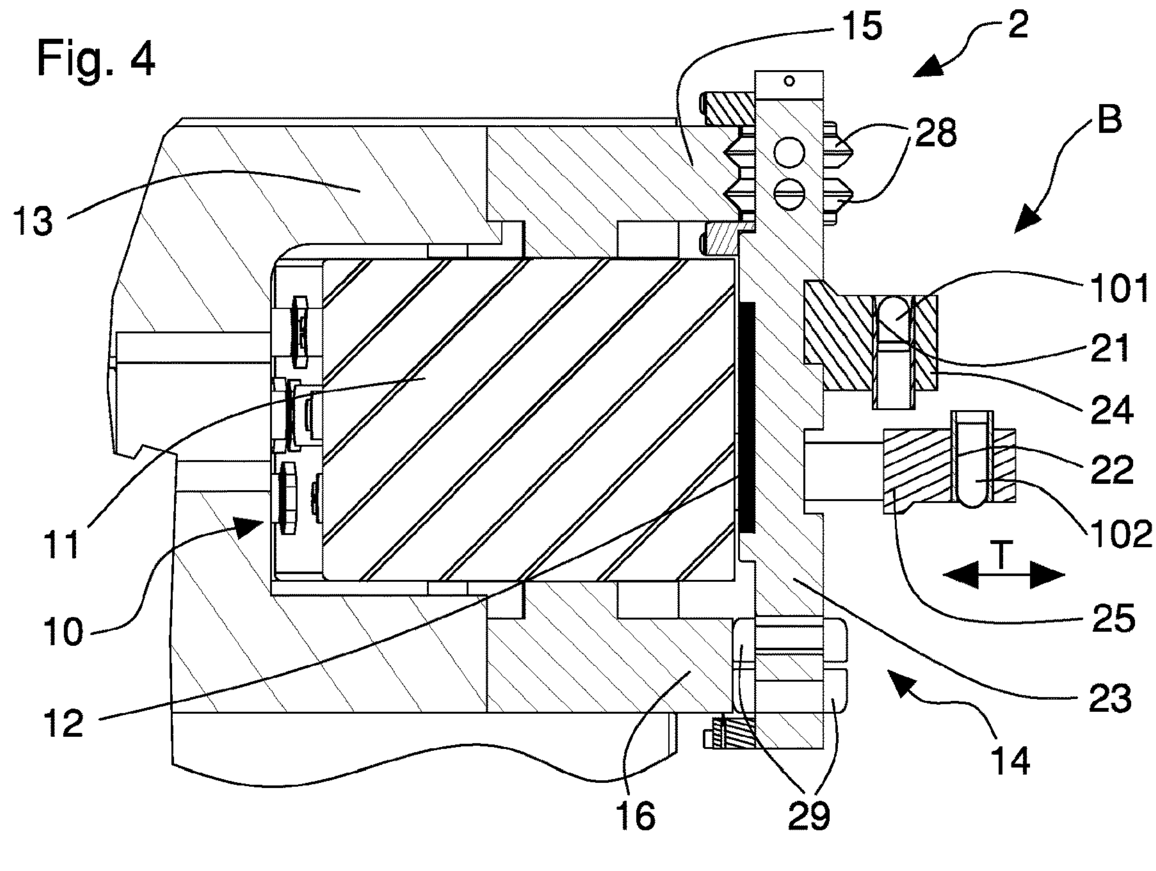
FIG. 4 is a section similar to that of FIG. 3 which shows the supporting elements of the transfer carriage in an offset position.

With particular reference to FIGS. 2 to 4, the moving system 2 includes a linear electric motor 10, a guide rail 13 which extends along a closed-loop motion path P and comprises a stator 11 of the linear electric motor 10 and a plurality of transfer carriages 14 slidably supported by the guide rail 13 and provided with respective seats 21, 22 suitable for separately housing the bodies 102 and the caps 101 of the capsules 100. The transfer carriages 14, or more simply the carriages 14, comprise respective rotors 12 of the linear electric motor 10 suitable for interacting separately and independently with respective magnetic fields generated by the stator 11 so as to move the respective carriages 14 according to the feed direction V with intermittent motion at least at the first dosing station 3 when activated and/or with continuous motion at least at the second dosing station 4 when activated.

In particular, the rotors 12 interacting with the magnetic fields generated by the stator 11 are subject to a linear force, i.e., headed along the feeding path P, that is proportional to the intensity of the magnetic field itself.

For example, with reference to the embodiment of FIG. 1, the transfer carriages 14 are intermittently moved in a first portion P1 of the motion path P which crosses, in addition to the first dosing station 3, the feeding station 5, the selection and rejection station 6, the closing station 7, the exit station 8. Differently, the transfer carriages 14 are moved with continuous motion in a second portion P2 of the motion path P which crosses the second dosing station 4.

The first dosing station 3 comprises first dosing means 31 arranged to dispense a first product into the bodies 102 of the capsules 100 during stop steps of the intermittent motion of the carriages 14, while the second dosing station 4 comprises second dosing means 32 arranged to dispense a second product into the bodies 102 of the capsules 100 during a continuous motion feed of the aforesaid carriages 14.

The first dosing means 31 of the first dosing station 3 comprise, for example, a dosing arm which supports at one end thereof a group of dosing devices 34 and is linearly, vertically and horizontally movable between a lowered picking position in which the dosing devices 34 are immersed in the product inside a reservoir 35 to load and pick up respective product doses, and a lowered dosing position in which the aforesaid dosing devices 34 are superimposed and substantially in contact with respective bodies 102 of the capsules 100 to dispense product doses.

The second dosing means 32 of the second dosing station 4 comprise a respective dosing turret rotating about a vertical axis with continuous motion and provided peripherally with dosing devices 36 angularly spaced from each other with respect to the vertical axis. During the rotation of the dosing turret, the dosing devices 36 release product doses into the bodies 102 of the capsules 100 at the second portion P1 of the motion path P. In the aforesaid second portion P1 the carriages 14 are moved in continuous motion, at the same speed as the dosing devices 36 and coordinated with the dosing turret so that each body 102, positioned in the respective second seat 22 of the carriage 16, corresponds to a respective dosing device 36.

In the embodiment illustrated in FIG. 1, the filling machine 1 also comprises a third dosing station 9 provided with third dosing means 33 arranged to dispense a third product into the bodies 102 of the capsules 100 during stop steps of the intermittent motion with which the carriages are moved. The third dosing means 33 comprise, for example, a respective turret rotating about a respective vertical axis and provided with two groups of dosing devices 37, angularly spaced 180° apart from one another with respect to the vertical axis and capable of picking up defined amounts or doses of product from a reservoir 38, in a picking position, transferring and then releasing the doses into the bodies 102 of the capsules 100, in a releasing position.

The first portion P1 of the motion path P also extends to the third dosing station 9, in particular when the latter is activated.

The filling machine 1 of the invention can also comprise one or more further dosing stations configured to dispense a respective product into the bodies 102 of the capsules 100 during the stop steps of the intermittent motion with which the carriages 14 are moved or to dispense a respective product into the bodies 102 of the capsules 100 moved by the carriages 14 with continuous motion.

The linear electric motor 10 is, for example, a linear induction or synchronous motor, of a known type and not described in detail, whose stator 11 extends along the entire length of the guide rail 13 along the motion path P and comprises a plurality of electric windings suitable to create, when supplied by an electric current, magnetic fields acting on the rotors 12 and controllable so as to autonomously and independently move each carriage 14 along the guide rail 13, in particular according to a specific law of motion as better explained in the following description. Electrical windings are electrical circuits which form multiple circular coils (solenoid) and are arranged to be driven by an electric current.

The stator 11 which is inserted inside the guide rail 13 is, for example, a modular stator formed by a plurality of modular elements 11*a*, 11*b*, in particular straight modular elements 11*a* and curvilinear modular elements 11*b* suitably mechanically and electrically connected. Each modular element 11*a*, 11*b* comprises a respective plurality of windings cooperating with the plurality of windings of the adjacent modular elements to generate, when crossed by electric current, the magnetic fields necessary to move the carriages 14 in the various sections of the motion path P with the required motion laws.

Similarly, the guide rail 13, which supports and comprises the stator 11, can be formed of a plurality of respective modular, straight and curvilinear elements, couplable to each other to form the closed-loop motion path P. For example, each modular element of the guide rail 13 supports and comprises a respective modular element of the stator 11. Thereby, the shape and extension of the guide rail 13 and the stator 11 housed therein can be easily and quickly varied as a function of the structure of the filling machine 1, and in particular the number, position and size of the operating stations.

The rotors 12 contained in the carriages 14 comprise respective permanent magnets and/or conductive material elements, for example iron.

The rotors 12 face and interact with an outer side wall of the substantially vertical stator 11 from which the magnetic fields generated by the windings crossed by electric current extend.

With particular reference to FIGS. 3 and 4, each carriage 14 comprises a plurality of wheels 28, 29 arranged for slidably engaging with respective guide portions 15, 16 of the guide rail 13. In particular, each carriage 14 comprises a main body 23, a first supporting element 24 fixed to the main body 23 and provided with a plurality of first seats 21, for example seven, suitable for housing the caps 101 of the capsules 100 and a second supporting element 25 slidably connected to the main body 23 and provided with a plurality of second seats 22 suitable for housing the bodies 102 of the capsules 100.

The second supporting element 25 is movable with respect to the main body 23 between a first operating position A, in which it is arranged below the first supporting element 24 so that the second seats 22 are aligned with the first seats 21 (in particular coaxial to a longitudinal axis of symmetry X of the caps 101 and bodies 102 of the capsules 100) to allow the caps 101 and bodies 102 to be decoupled or coupled, and a second operating position B, in which the second supporting element 25 is spaced, in particular offset from, and not below, the first supporting element 24 to allow at least one product to be dispensed into the bodies 102. More precisely, the second supporting element 25 is movable along an opening/closing direction T orthogonal to the longitudinal axis X and substantially horizontal. The second supporting element 25 is moved by operating means of known type and not illustrated in the figures.

In the embodiment shown in the figures, the permanent magnets 12 and/or the elements in conductive electrical and/or ferromagnetic material are housed and fixed inside the main body 23 of the carriage 14, facing the outer side wall of the stator 11.

Alternatively, the rotors 12 can consist of the same main bodies 23 as the carriages 14 suitably made of electrical and/or ferromagnetic conductive material.

The operation of the filling machine 1 of the invention includes the movement of the carriages 14 on the guide rail 13 along the motion path P through the various operating stations 3-9 with intermittent or continuous motion as a function of the type of operating station operating on the capsules 100. More precisely, at least at the feeding station 5, the first dosing station 3, the third dosing station 9, the selection and rejection station 6, the closing station 7 and the exit station 8, i.e., at the first portion P1 of the motion path P, the carriages 14 are moved by the linear electric motor 10 with intermittent motion to allow during the stop steps the execution of the various operations on the capsules 100 (loading and opening of the capsules, dosing of the product in the capsules, selection and rejection of the non-compliant capsules, closing of the capsules, and conveying the capsules out). The first and the second dosing stations 3, 9 may or may not be activated as a function of the product(s) to be dosed in the capsules 100.

It should be noted that in the sections of the first portion P1 of the motion path P between one operating station and the other, the law of motion (speed, acceleration) with which the carriages 14 are moved by the linear electric motor 10 may be different, in particular vary according to the length of the aforementioned sections.

At the second dosing station 4, if it is activated to dispense a respective product in the capsules 100, i.e., at the second portion P2 of the motion path P, the carriages 14 are instead moved by the linear electric motor 10 with a continuous motion to allow the second dosing means 32 to dispense a respective product in the bodies 102 of the capsules 100 while the latter are in motion.

More precisely, in a central section of the second portion P2 of the motion path P, the carriages 14 are moved at the same speed as the dosing devices 36 of the dosing turret of the second dosing means 32 and coordinated so that a respective dosing device 36 corresponds to each body 102 positioned in the respective second seat 22 of the carriage 16. In an initial section of the second portion P2 of the motion path P the carriages 14 are accelerated starting from a zero initial speed, when the carriages 14 are stopped at the first dosing station 3, if operating, or the third dosing station 9, if operating, to a final speed equal to that of the capsules 100 housed in the dosing turret of the second dosing means 32 rotating about the respective vertical axis. On the contrary, in an end section of the second portion P2 of the motion path P the carriages 14 are decelerated from an initial speed equal to that of the capsules 100 housed in the dosing turret of the second dosing means 32 rotating about the respective vertical axis to a zero final speed at the selection and rejection station 6.

By virtue of the moving system 2 of the filling machine 1 of the invention, comprising a linear electric motor 10 provided with a stator 11 housed in the guide rail 13 and rotors 12 housed in the respective transfer carriages 14 of the capsules 100, it is possible to operate the individual carriages 14 separately and independently and in particular to move the latter through the various operating stations of the filling machine with intermittent and/or alternating motion and with different laws of motion in the different sections of the motion path P.

It is possible through the control unit 30 of the filling machine 1 to quickly and easily select the dosing station(s) 3, 4, 9 to be activated during operation to dose the required product(s) and appropriately configure the linear electric motor 10 of the moving system 2 (in particular by acting on the electrical power supply of the different electrical windings present in the stator 11) so as to move the carriages 14 with intermittent and/or continuous motion according to the features of the activated dosing station(s).

By virtue of the linear electric motor 10 which allows to vary and select the laws of motion (speed, acceleration) with which to move the carriages 14 in the different sections of the motion path P between two adjacent operating stations, it is also possible to significantly reduce the number of carriages 14 necessary to transfer the capsules 100 and/or reduce the duration of the intermittent motion moving step, thus increasing the productivity of the filling machine 1 of the invention.

The moving system 2 with linear electric motor 10, in addition to ensuring high performance, also has a particularly simple, economical and robust structure and reliable and safe operation.

The invention claimed is:

1. A filling machine for filling capsules with at least one product in liquid or powder form, in granules, tablets, micro-tablets, or delayed-action drugs, comprising:

a plurality of operating stations for operating on said capsules;

a moving system for transferring said capsules in sequence through said plurality of operating stations that include at least a first dosing station and a second dosing station that are selectively activable and configured to fill said capsules with respective products;

wherein said moving system includes a linear electric motor, a guide rail which extends along a closed-loop motion path and comprises a stator of said linear electric motor and a plurality of transfer carriages associated with said guide rail and provided with respective seats configured for housing bodies and caps of said capsules, said transfer carriages comprising respective rotors of said linear electric motor interacting separately and independently with respective magnetic fields generated by said stator so as to move the respective transfer carriages along said guide rail with at least one of an intermittent motion at least at said first dosing station when said first dosing station is activated and a continuous motion at least at said second dosing station when said second dosing station is activate.

2. The filling machine according to claim 1, wherein said first dosing station comprises a first dosing device configured to dispense a first product into the bodies of said capsules during stop steps of said intermittent motion of said transfer carriages.

3. The filling machine according to claim 1, wherein said second dosing station comprises a second dosing device configured to dispense a second product into said bodies of said capsules during a continuous motion of said transfer carriages.

4. The filling machine according to claim 1, wherein said rotors of said transfer carriages comprise at least one of respective permanent magnets and elements made of electrical/magnetic conductive material.

5. The filling machine according to claim 1, wherein said stator extends for the entire length of said guide rail along said motion path and comprises a plurality of electric windings configured to create a plurality of magnetic fields acting on said rotors.

6. The filling machine according to claim 1, wherein said stator comprises a plurality of modular elements.

7. The filling machine according to claim 6, wherein said plurality of modular elements comprise rectilinear modular elements and curvilinear modular elements.

8. The filling machine according to claim 1, wherein each transfer carriage comprises a plurality of wheels arranged for slidably engaging respective guide portions of said guide rail.

9. The filling machine according to claim 1, comprising a third dosing station provided with third dosing device configured to dispense a third product into said bodies of said capsules during stop steps of said intermittent motion of said transfer carriages.

10. The filling machine according to claim 1, wherein each transfer carriage comprises a main body, a first supporting element fixed to said main body and provided with a plurality of first seats configured for housing caps of said capsules and a second supporting element slidably connected to said main body and provided with a plurality of second seats configured for housing the bodies of said capsules.

11. The filling machine according to claim 10, wherein said second supporting element is movable with respect to said main body between a first operating position, wherein said second supporting element is arranged under the first supporting element so that the second seats are aligned with the first seats to allow said caps and said bodies to be decoupled or coupled, and a second operating position, wherein said second supporting element is spaced from the first supporting element to allow at least one product to be dispensed into said bodies.

12. The filling machine according to claim 1, comprising a control unit adapted to control said operating stations and said moving system.

13. The filling machine according to claim 12, wherein said control unit is adapted to control a linear electric motor of said moving system so as to drive separately and independently said rotors associated with the respective transfer carriages and move the transfer carriages with intermittent motion in a first portion of said motion path at least at said first dosing station when said first dosing station is activated and with continuous motion in a second portion of said motion path at least at said second dosing station when said second dosing station is activated.

* * * * *